(12) United States Patent
Thomas

(10) Patent No.: US 9,049,229 B2
(45) Date of Patent: Jun. 2, 2015

(54) EVALUATION OF DNS PRE-REGISTRATION DATA TO PREDICT FUTURE DNS TRAFFIC

(75) Inventor: Matthew Thomas, Lausanne (CH)

(73) Assignee: VERISIGN, INC., Reston, VA (US)

( * ) Notice: Subject to any disclaimer, the term of this patent is extended or adjusted under 35 U.S.C. 154(b) by 773 days.

(21) Appl. No.: 13/171,584

(22) Filed: Jun. 29, 2011

(65) Prior Publication Data

US 2012/0110165 A1    May 3, 2012

Related U.S. Application Data

(60) Provisional application No. 61/407,642, filed on Oct. 28, 2010, provisional application No. 61/407,632, filed on Oct. 28, 2010, provisional application No. 61/407,636, filed on Oct. 28, 2010, provisional application No. 61/407,638, filed on Oct. 28, 2010.

(51) Int. Cl.
    *G06F 15/16*    (2006.01)
    *H04L 29/12*    (2006.01)

(52) U.S. Cl.
    CPC ...... *H04L 61/1511* (2013.01); *H04L 29/12066* (2013.01)

(58) Field of Classification Search
    CPC ............. H04L 29/12066; H04L 61/1511; H04L 67/1002; G06F 15/16
    USPC ....................................... 709/224
    See application file for complete search history.

(56) References Cited

U.S. PATENT DOCUMENTS

| | | | |
|---|---|---|---|
| 6,332,158 B1 | 12/2001 | Risley et al. | |
| 6,560,634 B1 | 5/2003 | Broadhurst | |
| 6,606,657 B1 | 8/2003 | Zilberstein et al. | |
| 6,745,248 B1 | 6/2004 | Gardos et al. | |
| 7,805,379 B1 | 9/2010 | Adkins, III et al. | |
| 8,504,673 B2 * | 8/2013 | Thomas | 709/223 |
| 2002/0087679 A1 | 7/2002 | Pulley et al. | |
| 2002/0091703 A1 | 7/2002 | Bayles | |
| 2002/0147805 A1 | 10/2002 | Leshem et al. | |
| 2003/0229692 A1 * | 12/2003 | Vo | 709/224 |
| 2004/0083283 A1 * | 4/2004 | Sundaram et al. | 709/224 |
| 2005/0005027 A1 * | 1/2005 | Drouet et al. | 709/245 |

(Continued)

OTHER PUBLICATIONS

A. Kumar, J. Postel, C. Neuman, P. Danzig, S. Miller, Common DNS Implementation Errors and Suggested Fixes, Network Working Group Request for Comments: 1536, Oct. 1993, pp. 1-13 (retrieved from http://tools.ietf.org/html/rfc1536).

*Primary Examiner* — Razu Miah
(74) *Attorney, Agent, or Firm* — MH2 Technology Law Group, LLP

(57) ABSTRACT

Methods and systems analyze historical NXD traffic to predict future DNS traffic. In one embodiment, a system may count NXD responses generated by an Authoritative DNS server during a particular time period and calculate the variance in NXD traffic for domains over time. The system may then generate a coefficient of variance (CoV) value for each domain observed. Finally, the system may predict positive domain traffic based upon the calculated CoV data. In other embodiments, the system may also base the prediction on the classification of domains as "original" domains or "re-registered" domains. In another embodiment, the system may also base the prediction on the "size" of name servers. Additionally, or alternatively, the system may determine the number of unique name servers for a domain and base the prediction on the number of unique name servers for a particular domain name.

19 Claims, 13 Drawing Sheets

(56) References Cited

U.S. PATENT DOCUMENTS

| | | |
|---|---|---|
| 2005/0038894 A1* | 2/2005 | Hsu et al. ................. 709/228 |
| 2005/0144323 A1* | 6/2005 | Gardos et al. .............. 709/245 |
| 2005/0198268 A1 | 9/2005 | Chandra |
| 2006/0095404 A1 | 5/2006 | Adelman et al. |
| 2006/0212426 A1* | 9/2006 | Shakara et al. ................ 707/3 |
| 2007/0220110 A1 | 9/2007 | Auxer et al. |
| 2008/0027812 A1* | 1/2008 | Hsu et al. ................... 705/14 |
| 2008/0028463 A1* | 1/2008 | Dagon et al. ................. 726/22 |
| 2008/0086556 A1* | 4/2008 | Ramalingam et al. ....... 709/224 |
| 2008/0104113 A1 | 5/2008 | Wong et al. |
| 2008/0208949 A1* | 8/2008 | Tanaka et al. ............... 709/201 |
| 2009/0013089 A1* | 1/2009 | Sullivan et al. .............. 709/238 |
| 2009/0037421 A1* | 2/2009 | Gamble ........................ 707/10 |
| 2009/0100162 A1* | 4/2009 | Holostov et al. ............. 709/223 |
| 2009/0319367 A1 | 12/2009 | Sullivan |
| 2010/0049847 A1* | 2/2010 | Muret et al. ................. 709/224 |
| 2010/0100957 A1* | 4/2010 | Graham et al. ............... 726/22 |
| 2010/0106833 A1* | 4/2010 | Banerjee et al. ............. 709/226 |
| 2010/0106854 A1* | 4/2010 | Kim et al. .................... 709/238 |
| 2010/0165844 A1* | 7/2010 | Pongracz et al. ............ 370/235 |
| 2010/0228759 A1 | 9/2010 | Thomas |
| 2010/0318681 A1* | 12/2010 | Shi ............................... 709/245 |
| 2010/0325250 A1 | 12/2010 | Colosi |
| 2011/0035469 A1 | 2/2011 | Smith et al. |
| 2012/0311114 A1* | 12/2012 | Cheshire ...................... 709/221 |

* cited by examiner

EVALUATION OF DNS PRE-REGISTRATION DATA TO PREDICT FUTURE DNS TRAFFIC

CROSS-REFERENCE TO RELATED APPLICATIONS

This application claims priority from U.S. provisional application No. 61/407,642, filed Oct. 28, 2010, U.S. provisional application No. 61/407,632, filed Oct. 28, 2010, U.S. provisional application No. 61/407,636, filed Oct. 28, 2010, and U.S. provisional application No. 61/407,638, filed Oct. 28, 2010. Each previously filed application is hereby incorporated by reference in their entirety.

FIELD OF THE INVENTION

The present disclosure relates generally to methods and systems for analyzing historical NXD traffic to predict future DNS traffic.

BACKGROUND OF THE INVENTION

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

To make the identification of destination computer systems more easily usable by humans, a Domain Name System (DNS) has been developed that translates a unique alphanumeric name for a destination computer system into the IP address for that computer. The alphanumeric name is called a "domain name." For example, the domain name for a hypothetical computer system operated by Example Corporation may be "website.example.com". Using domain names, a user attempting to communicate with this computer system could specify a destination of "website.example.com" rather than the particular IP address of the computer system (e.g., 198.81.209.25).

The domain names in the DNS are structured in a hierarchical, distributed database that facilitates grouping related domain names and computers and ensuring the uniqueness of different domain names. In particular, as mentioned above, a particular domain name such as "example.com" may identify a specific host computer. However, the hierarchical nature of the DNS also allows a domain name such as "example.com" to represent a domain including multiple other domain names each identifying computers (also referred to as "hosts"), either in addition to or instead of identifying a specific computer.

New domain names can be defined (or "registered") by various domain name registrars. In particular, a company that serves as a registrar for a top-level domain (TLD) such as .com, .net, .us, and the like, can assist customers in registering new domain names for that TLD and can perform the necessary actions so that the technical DNS information for those domain names is stored in a manner accessible to name servers for that TLD. Registrars often maintain a second-level domain name within the TLD, and provide an interactive website at their domain name from which customers can register new domain names. A registrar will typically charge a customer a fee for registering a new domain name.

For the .com, .net, and .org TLDs, a large number of registrars currently exist, and a single shared registry ("the Registry") under the control of a third-party administrator stores information identifying the authoritative name servers for the second-level domain names in those TLDs. Other TLDs may have only a single registrar, and if so that registrar may maintain a registry for all the second-level domains in that TLD by merely storing the appropriate DNS information for each domain name that the registrar registers. In other situations, multiple registrars may exist for a TLD, but one of the registrars may serve as a primary registrar that maintains a registry for each of the second-level domains in that TLD. If so, the secondary or affiliate registrars for that TLD supplies the appropriate DNS information for the domain names that they register to the primary registrar. Thus, the manner in which the DNS information for a TLD is obtained and stored is affected by the registrars for that TLD.

Users of the aforementioned DNS generally do not communicate directly with a Root DNS Server. Instead, resolution typically takes place transparently in applications programs such as web browser and other Internet applications at the local computer level. When an application requires a domain name lookup, such programs send a resolution request to the DNS resolver in the local operating system, which in turn handles the communications required.

The DNS resolver often has a cache containing recent lookups. If the cache can provide the answer to the request, the resolver will return the value in the cache to the program making the request. If the cache does not contain the answer (or the information has expired), the resolver will typically send the request through a series of network devices to one or more designated DNS servers. In the case of most home users, the Internet Service Provider (ISP) to which the machine connects will supply this DNS server. In any event, the name server thus queried will follow the process outlined above until it successfully finds a result or determines that none is available. It then returns any results to the DNS resolver, the resolver caches the result for future use and passes the result back to the software which initiated the request.

In the case of a domain that is not registered, a corresponding domain resolution request will need to traverse to the level of an Authoritative Root DNS Server. The Root DNS Server will reply with an authoritative response of a "non-existent domain". Requests to resolve such non-existent domains are retained in an external repository. NXDomains (or NXD) is a term used for the Internet domain name that is unable to be resolved using the DNS implementation owing either to the domain name not yet being registered or a server problem. The reference to the NXDOMAIN is published in RFC 1035 (Domain names—implementation and specification) and also in RFC 2308, both of which are incorporated herein by reference in their entireties.

For domains that are registered, a domain resolution request handled by an authoritative DNS Server results in a YXDOMAIN (YXD) response. The YXD response is defined in RFC 2136, which is incorporated by reference in its entirety.

Further information regarding the DNS, including tracking and use of NXD responses and similar aspects of the DNS, is provided in U.S. application Ser. No. 12/609,831, filed Oct. 30, 2009, U.S. application Ser. No. 12/859,810, filed Aug. 20, 2010, and U.S. application Ser. No. 12/859,820, filed Aug. 20, 2010, the disclosure of each of which is incorporated by reference in its entirety.

SUMMARY OF THE INVENTION

In accordance with disclosed embodiments, potentially valuable Non-Existent Domain (NXD) names may be identified by analyzing, among other things, Domain Name System ("DNS") pre-registration data. Such embodiments allow companies to identify NXDs that exhibit DNS traffic patterns that are determined to result in higher positive DNS traffic post-registration.

A tool implementing disclosed embodiments may receive a request for analysis that identifies one or more domain names. The tool may further collect and analyze DNS requests associated with NXDs receiving DNS traffic during an identified time period (including one or more NXDs specifically identified in a request). The tool may then predict positive domain traffic for domains based on data generated from the collected DNS requests. The tool may express predicted DNS traffic in several ways, including (i) relative monetization values for domains, (ii) value ratings or classifications for a domain according to a baseline, and/or (iii) traffic statistic predictions for one or more domains.

In one embodiment, the tool may count the NXD responses generated by an Authoritative DNS server during a particular time period. The tool may next calculate the variance in NXD traffic for domains over time. Based on the variance data, the tool may generate a coefficient of variance (CoV) value for each domain observed. Finally, the tool may predict positive domain traffic for a domain based upon an analysis of the calculated CoV data, wherein a domain having a higher CoV is expected to have less positive domain traffic following registration. The tool may additionally, or alternatively, identify a domain as an "original" domain or "re-registered" domain and predict positive domain traffic for a domain based at least in part on the identification. An "original" domain includes domains that have never before been registered. Conversely, a "re-registered" domain was previously registered, but the registration has since lapsed.

In another embodiment, the tool may determine the size of name servers according to the number of NXD requests sent by each name server and predict positive domain traffic for a domain based on the size of the name server requesting that domain. Additionally, or alternatively, the number of unique name servers for a domain may be determined, and the positive domain traffic for a domain predicted based on the number of unique name servers for a particular domain name.

DESCRIPTION OF THE EMBODIMENTS

Figure 1:
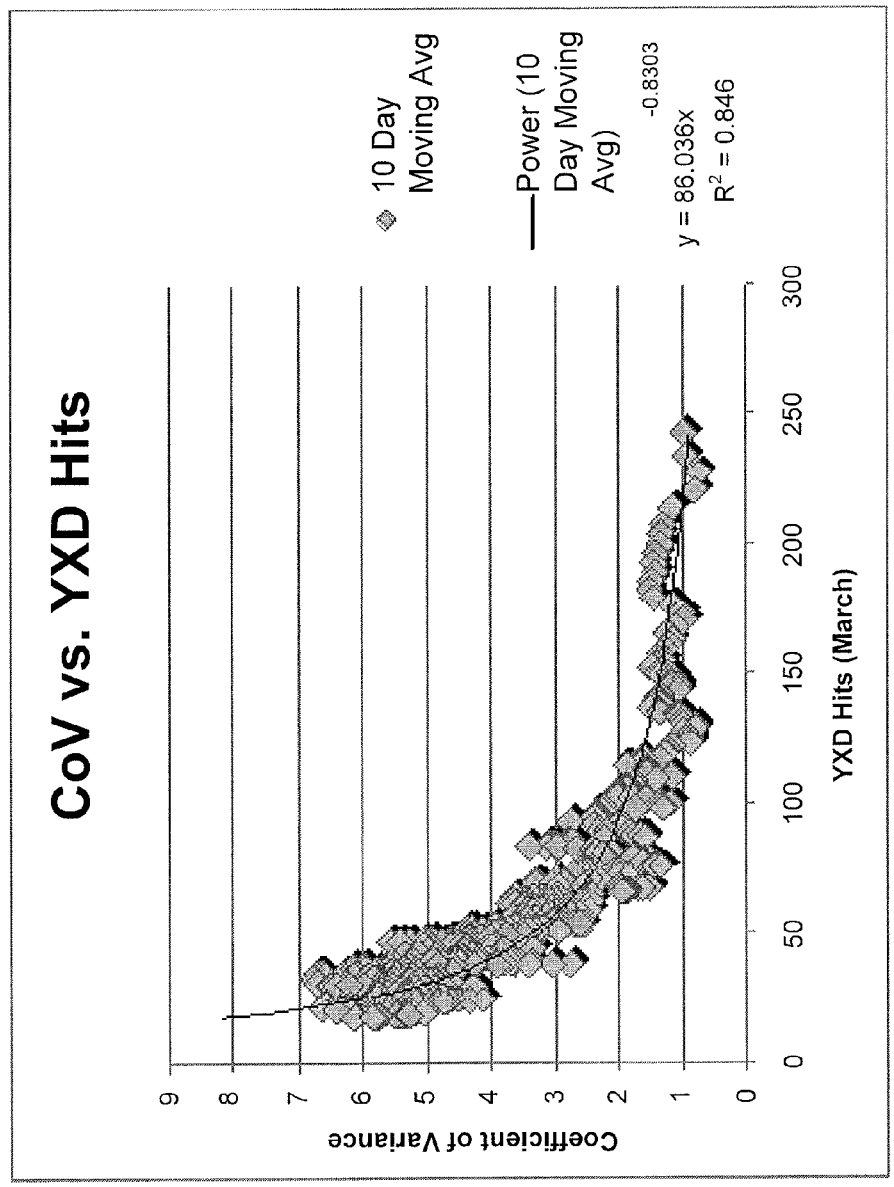
FIG. 1 depicts illustrative results from analyses performed consistent with disclosed embodiments, plotting a CoV series against the respective YXD hits received in a month following a domain registration as a measure of volatility.

It is understood that the invention is not limited to the particular methodology, protocols, topologies, etc., as described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

DNS records, including NXD records, may be used to derive various information about registered, unregistered, and unresolvable domains. Various techniques for doing so are described in U.S. application Ser. Nos. 12/859,810 and 12/859,820, and in Shuang Hao, Nick Feamster, and Ramakant Pandranki, *An Internet-Wide View into DNS Lookup Patterns*. The latter paper refers to YXD analysis, but similar techniques may be applied to NXD records.

It has been found that various techniques for analyzing pre-registration and other DNS data may be used in conjunction to obtain a range of information about potential domain names before the names are registered in the DNS. In embodiments of the invention, data based on NXD requests from name servers, historical NXD traffic, and a domain's registration history each may be used in combination with some or all of the others to obtain a profile of a particular domain name or sets of domain names.

In an embodiment, a technique for evaluating a domain may include identifying the domain as an Original Domain or as a Re-registered domain, receiving non-existent domain (NXD) requests from a plurality of name servers for the domain over a first period of time, determining the size of each of the plurality of name servers, the size of a name server being proportional to the total number of NXD requests sent by the name server for the specified time period, and calculating the variance in the NXD responses for the domain over time, as well as the total number of unique name servers requesting the domain in the specified time period. Based upon at least one of the calculated variance, the identification of the domain as Original or Re-registered, the determined sizes of the plurality of name servers, the total number of unique name servers requesting the domain during the specified time period, or a combination thereof, it is possible to predict one or more metrics related to the domain. In an embodiment, the metric includes at least one of the expected name-in-use (YXD) response level for the domain, the expected click traffic for the candidate domain relative to at least one other domain, or a combination thereof.

Predicting Future DNS Traffic Based on Historical NXD Traffic

As disclosed herein, NXD lookup patterns may be characterized based upon how the lookup patterns differ for domains which receive large amounts of YXD traffic immediately after registration versus those domains which receive little YXD traffic immediately after registration. It has been found that domains with NXD traffic patterns which exhibit smaller variance in their temporal characteristics tend to exhibit a higher level of YXD traffic upon registration. This distinct temporal characteristic of NXD traffic of unregistered domains suggests it may be possible to predict and quantify the amount of YXD traffic for a domain given its NXD traffic, using the domain's historical traffic records. This may provide an indication of the domain's expected value, click traffic rate, and other measures.

In an embodiment, a domain tracking system may count NXD responses generated by an authoritative name server for a domain during a period of time, calculate the variance in NXD responses over time, and, based upon the variance, predict the expected YXD response level and/or click traffic. In some embodiments, the variance in NXD responses over time is calculated using the IP addresses of the requesting name servers. The variance, expected YXD traffic, and/or the expected click traffic may be used to rate or value the domain. Typically, domains with higher YXD traffic and/or higher click traffic are rated higher or considered more valuable than domains with lower YXD and/or click traffic.

In an embodiment, a system may count NXD responses for a set of domains during a period of time and calculate the variance in NXD responses during this time. The calculated variance may then be used to assign expected YXD and/or click traffic levels to the domains, with a higher variance indicating a lower traffic level. The domains may be ranked by the expected traffic level or levels, and each domain's relative rank may be used to determine an expected value or other rating. These ranks and/or the associated valuation may be provided to a purchaser seeking to register one or more domains.

The domain tracking, analysis, registration, and other functions described herein may be performed by a domain registrar, registry, Internet Service Provider (ISP) or any associated or similar system. Typically, NXD and YXD traffic may be collected by any name server, especially authoritative name servers for a particular domain. The metrics and ranking described herein may be performed by the registrar or registry system, or by a system in communication with the registrar and/or registry.

Experimental Data

A set of 643 domains was selected, and YXD measurements for all of these domains during a month were collected. These YXD scores were used in the correlation of the NXD Jaccard Index and Co variance measurements.

Temporal Behavior Analysis

On any given day, the IP addresses that query a particular domain can be expressed as a set. By examining sets of IP addresses on a daily basis, it can be determined how the set of name servers that queried a particular domain evolved over time. This analysis makes use of the Jaccard index to measure the similarity of these sets over time.

In an example of such analysis, daily NXD records over a month were grouped into daily sets of IP addresses using a /24 subnet. The Jaccard index from Day (X) to Day (X+1) was calculated for the specified time period. The average of these index values, as well as the standard deviation was calculated for each domain. Using the standard deviation and mean Jaccard index, each domain's coefficient of variance (CoV) was then calculated. This statistical measurement presents a measure of volatility. By plotting the results of the CoV series against the respective YXD hits received in the subsequent month after the domain was registered, it was found that the data exhibit a direct correlation between the YXD traffic and the domain's prior month's CoV measurement. These results are shown in FIG. 1.

Figure 2:
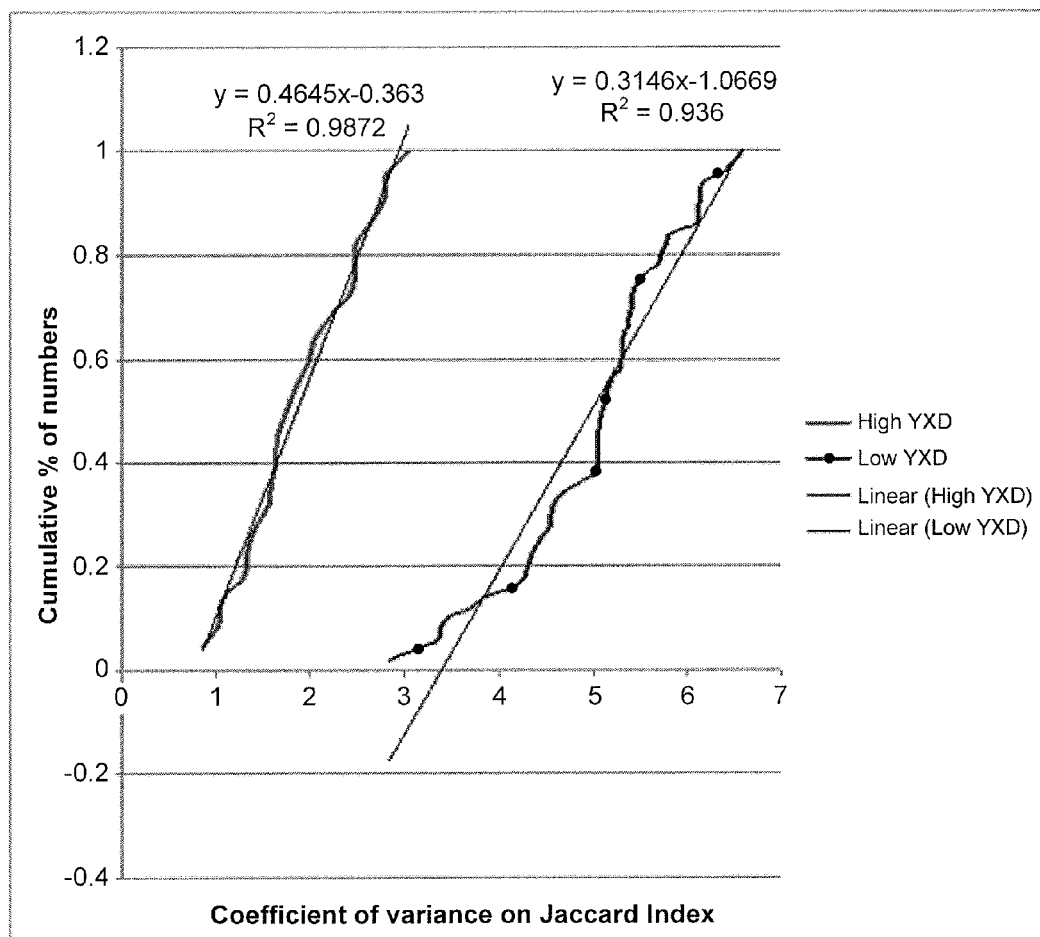
FIG. 2 is an illustrative representation of the distribution of CoV values for similarity metrics associated with domains whose YXD hits exceed the group mean and domains whose YXD hits falls below the group mean, generated according to analyses consistent with disclosed embodiments.

Next, the domains were separated into two groups by partitioning the domains into a group of domains whose average YXD hits exceeded the group's average and a group of domains whose average YXD hits were less than the average. The mean YXD hits for all domains was calculated and any domain receiving more than the mean was placed into the high group and those receiving below the mean were placed into the low group. To show the variability of the Jaccard index between the high and low groups, the CoV values were plotted as the distribution of CoVs for both groups. FIG. 2 shows the distribution of the CoV for similarity metrics of the two groups. A larger CoV indicates more "churn" from one day to the next. As shown in FIG. 2, it was found that the "high YXD" group generally exhibits less churn in the similarity metric, while the "low YXD" group exhibits higher levels of churn.

These data indicate that the correlation between the CoV within NXD traffic prior to a domain's registration can be utilized as a reliable metric for predicting YXD traffic after registration.

Click traffic reported for a particular month can also be analyzed using the CoV measurements described above. As used herein, a "click" refers to a monetization event (i.e. a conversion) that occurs when a user "clicks" on an advertisement displayed on a domain's website; "click traffic" is the resulting network traffic.

Click Traffic and the Coefficient of Variance

Figure 3:
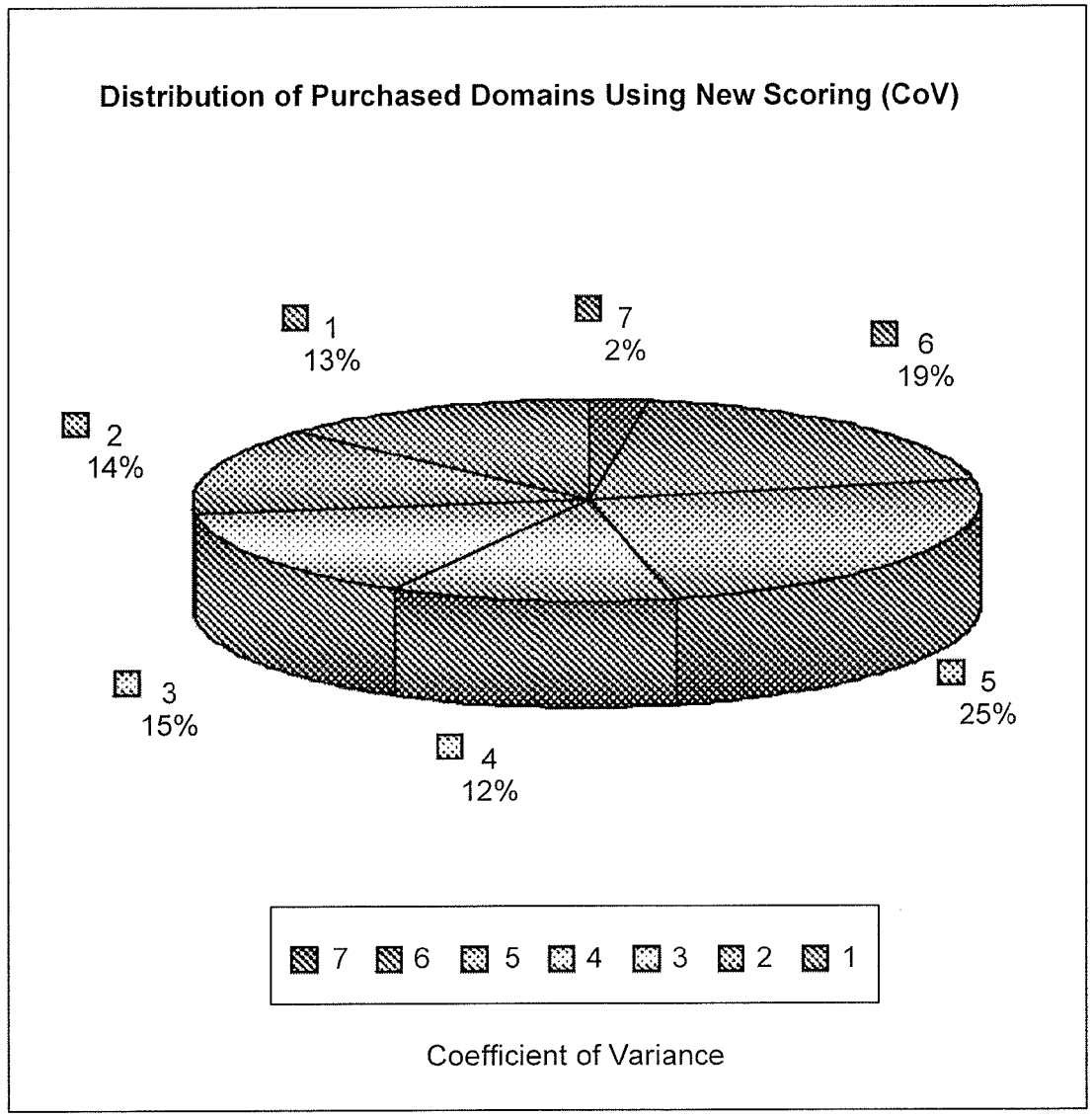
FIG. 3 is an illustrative representation of the distribution of domains by their calculated CoV value, generated according to analyses consistent with disclosed embodiments.

As described above, a set of domains received a varied amount of YXD traffic as well as click traffic. The domains used within this study may be grouped to demonstrate the distribution of domains under this new CoV metric. It was found that approximately 73% of the domains received CoV values equal or higher to 3. Those domains would be categorized into the low group of YXD traffic receivers. FIG. 3 shows the distribution of domains by CoV.

Figure 4:
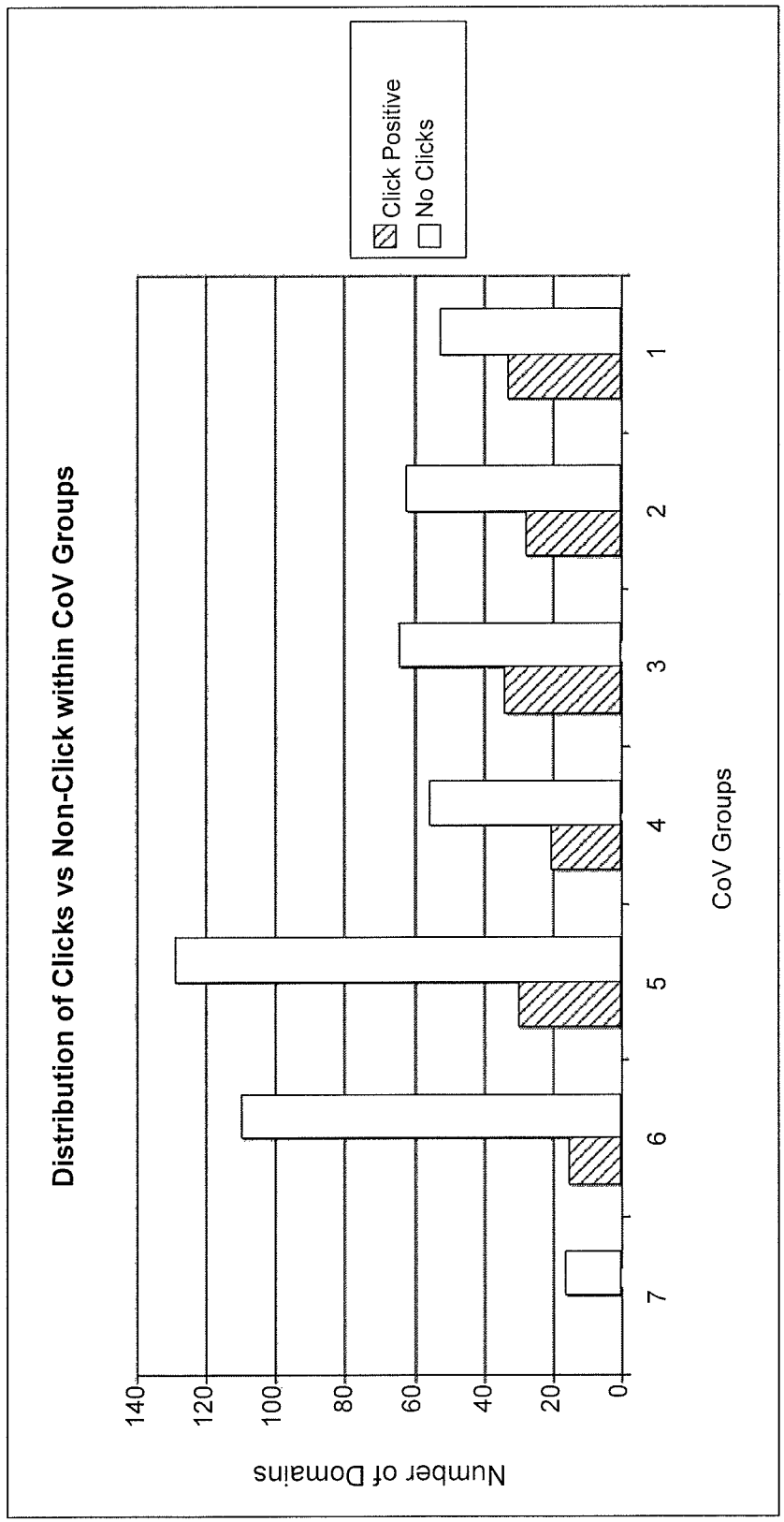
FIG. 4 is an illustrative representation of the distribution of domains receiving or not receiving click traffic according to their CoV value, generated according to analyses consistent with disclosed embodiments.

Using the click traffic received by each domain in a particular month, the set of domains was partitioned into two groups: those receiving greater than zero click traffic, and those receiving no click traffic. The distribution of these two groups under the new CoV metric is shown in FIG. 4.

Figure 5:
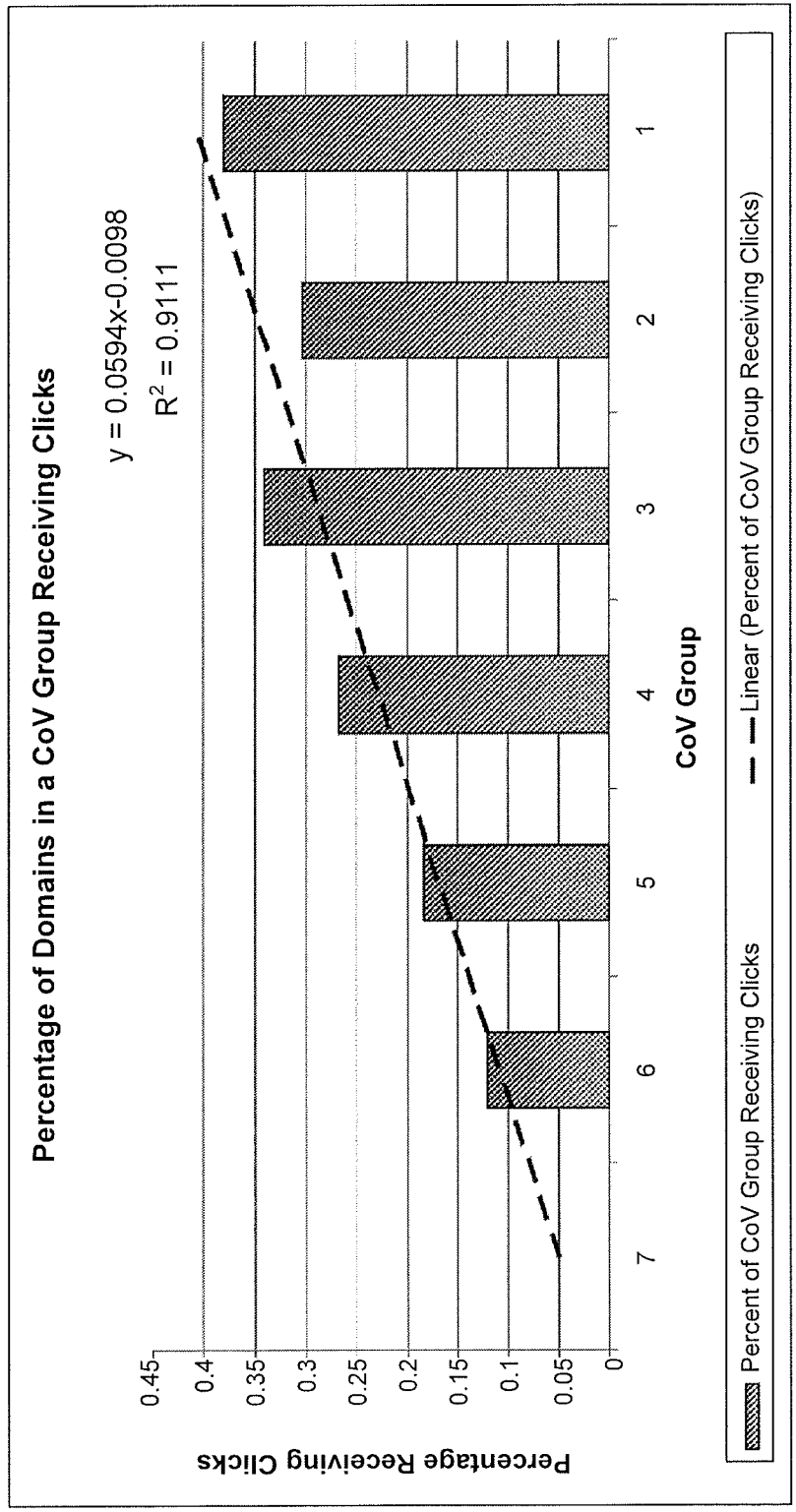
FIG. 5 is an illustrative representation of the percentage of Domains in a CoV group receiving click traffic, generated according to analyses consistent with disclosed embodiments.

FIG. 5 shows values for the percentage of each CoV group receiving click traffic, i.e., <number of domains receiving click traffic>/<total number of domains in each group>. FIG. 5 illustrates that the number of domains in groups having lower CoV values generally receive more click traffic. This indicates that the CoV metrics for domains may be more reliable metrics for determining whether a NXDomain is more or less likely to receive immediate YXD and/or click traffic once it is registered.

Domain Registration History

As disclosed herein, it has been found that the registration history of a domain may be used to predict future YXD traffic, click traffic, and/or other use of the domain. Domains can be logically divided into two distinct categories: Original Domains and Reregistered Domains. As used herein, an "Original Domain" is a domain that has never been registered at any point during a TLD's registration history. A "Reregistered Domain" refers to a domain name that was once registered, subsequently was deleted from the registry, and has again become available for registration.

Upon registration of a domain, documents detailing it (zone files, Whois, etc.) are published by the registrar and/or the registry. As a result, Internet agents such as bots, spiders, spammers, etc. can become aware of the new domain and begin to issue DNS queries to resolve the domain. Such agents, which also may be referred to as web robots, WWW robots or simply "bots", are software applications that run automated tasks over the Internet. Typically, bots perform tasks that are both simple and structurally repetitive, at a much higher rate than would be possible for a human alone. One of the largest uses of bots is in web spidering, in which an automated script fetches, analyzes and files information from web servers at many times the speed that might be manually implemented by a human. In the context of issued DNS queries, if a domain expires or becomes available for reregistration, Internet agents may continue to issue DNS queries for that domain and accordingly produce NXD traffic responses. These queries may pollute or skew NXD data, especially when the data is analyzed to determine the relative traffic to the domain, or traffic that may be expected if the domain is reregistered. NXD traffic responses may also be caused for numerous other reasons including bookmarks to deleted domains, DNS misconfigurations, etc. These types of pollution make the analysis of Reregistered Domains more challenging.

It has been found that an Original Domain and its associated NXD traffic can be viewed as a "pure" form of "type-in traffic," i.e., traffic resulting from an explicit user request such as where the user types the domain into a web browser address bar. Because the domain has never been registered, automated Internet agents are unable to cause NXD pollution unless they utilize some brute-force approach or create an unintentional polluting resource, such as an email containing a bad link. Therefore, NXD requests for Original Domains can be presumed to be human generated, and an Original Domain's NXD traffic should provide an indication of the amount of demand for that particular domain at a relatively high confidence level. Accordingly, it would be expected that this demand to be reflected in the amount of click traffic received post-registration.

In an embodiment, a domain tracking system may identify domains as Original or Reregistered and, based upon the classification, project the expected click, YXD, or other traffic for the domain. The projections may be made relative to one or more other domains. The system also may calculate a coefficient of variance of NXD requests for the domain, and use this variance to further refine the projected traffic level or levels. This data may be provided to potential registrants, and/or used to valuate the domain.

In an embodiment, a tracking system may classify each domain in a set of domains as Original or Reregistered, and/or calculate the variance in NXD data for each domain. The classification and/or NXD variance may be used to determine the expected click traffic for the domains, where a higher variance indicates a lower expected traffic level. The expected traffic may be determined relatively for each domain, and may be provided to potential registrants, for example as part of a valuation or ranking of the domain.

Experimental Data

A set of 643 domains was selected, and YXD measurements for all of these domains during a month were collected. These YXD scores were used in the correlation of the NXD Jaccard Index and Covariance measurements.

Registration History Analysis

A Jaccard index was calculated to measure the amount of overlap of requesting IP addresses that queried a particular domain from one day to the next. Using the average of these index values and their standard deviation, each domain's Coefficient of Variance (CoV) was calculated, which provides a measure of the domain's volatility. These two calculated metrics were used in conjunction with YXD and click traffic measurements for the domains.

Figure 6:
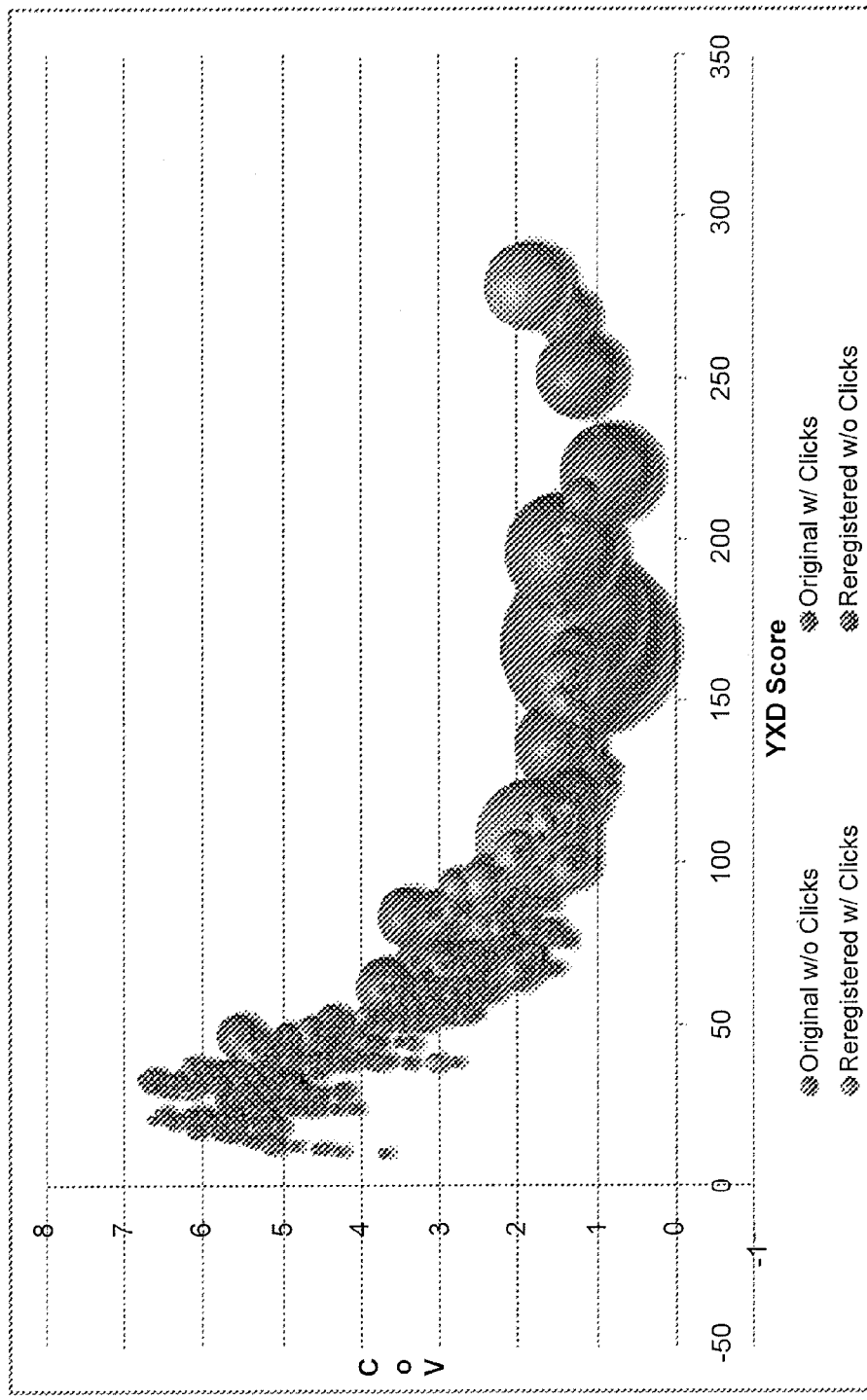
FIG. 6 is an illustrative representation of domains plotted against their CoV and subsequent month's YXD scores, generated according to analyses consistent with disclosed embodiments.

FIG. 6 shows the 643 domains (including 245 Original and 398 Reregistered) plotted against their CoV and subsequent month's YXD scores. The chart also illustrates each domain's click traffic as a bubble having a size proportional to the number of clicks received by the domain, with larger bubbles representing more click traffic. The domains were also separated into four groups: Original with Clicks, Original without Clicks, Reregistered with Clicks, and Reregistered without Clicks. Any domain receiving one or more Clicks was placed in a group with Clicks, while domains receiving zero Clicks were placed in the without Clicks groups.

The chart in FIG. 6 suggests several generalizations about the observed domains. Domains exhibiting smaller CoV values tend to be the recipients of larger YXD requests post-registration. Domains with larger YXD values also tend to receive more Click traffic. Original domains with Clicks are also found to be the primary receivers of Click traffic. Reregistered domains with Clicks are more sparse and do not account for a large percentage of domains receiving Click traffic.

Comparison of Click Rates for Original and Reregistered Domains

Figure 7:
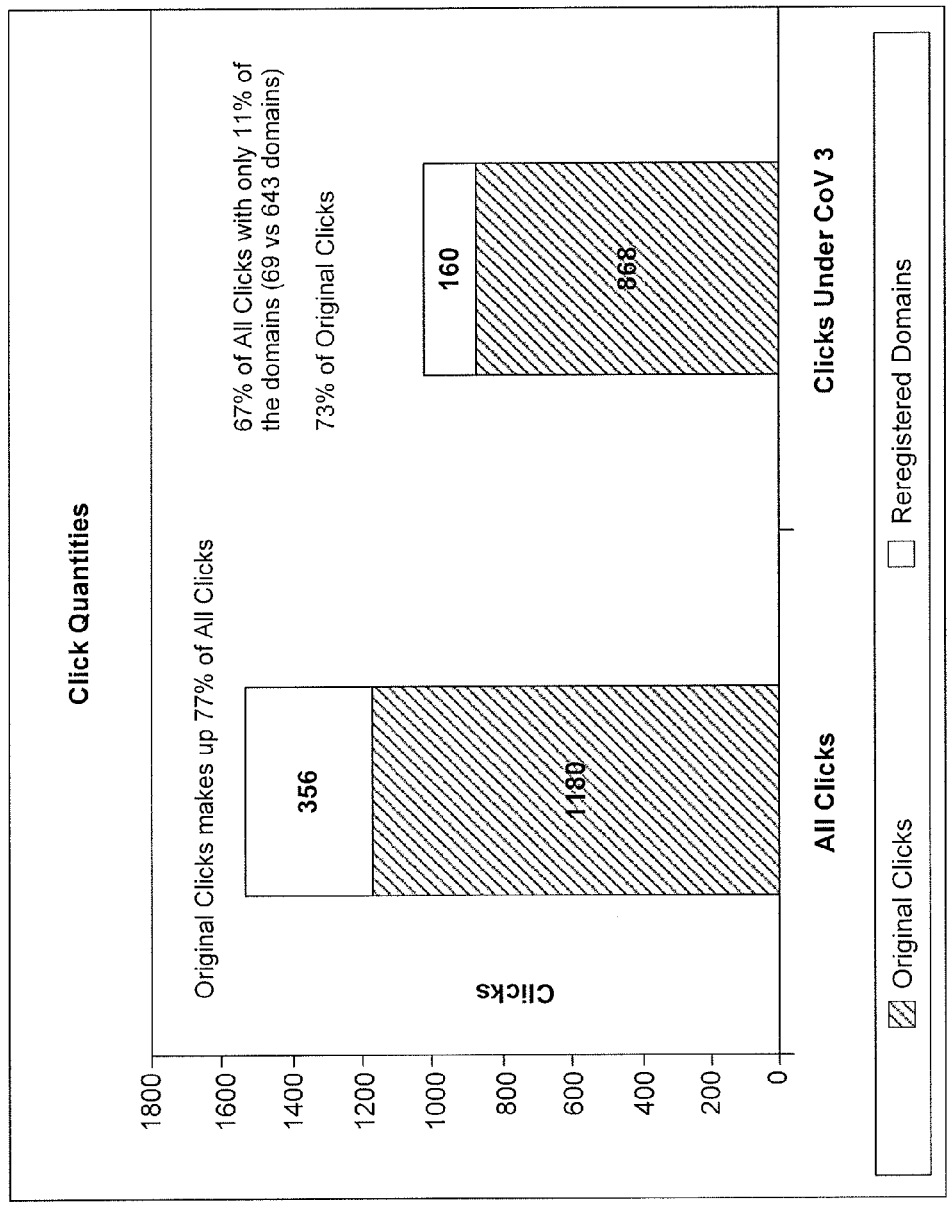
FIG. 7 is an illustrative representation of click traffic received by a group of domains according to their variances and registration histories, generated according to analyses consistent with disclosed embodiments.

The influence of a domain's history on subsequent traffic for the domain may be further developed by comparing the amount of Clicks received by both Original and Reregistered domains. FIG. 7 shows click traffic received by the domains according to their variances and registration histories. The left column illustrates a Click comparison of all 643 domains separated into groups of Original and Reregistered.

The set of domains received a total of 1536 Clicks, of which 1180 or 77% were attributed to Original domains. This suggests that the primary recipients of Clicks are Original domains, while Reregistered domains do not receive a significant relative portion of Click traffic.

As disclosed herein, domains with smaller CoV values tend to exhibit larger amounts of YXD traffic and accordingly receive more Click traffic. Therefore, by only measuring the domains under a CoV value of 3, the effect of filtering domains by their CoV value and observe the Click quantities of Original and Reregistered domains within this subset of domains may be observed.

The column on the right of FIG. 7 depicts this filtering technique. The amount of Clicks received is 1028 or 67% of the initial set. However, the total number of domains measured at a level of under CoV 3 is reduced to 11% of the initial group (69 versus 643). This suggests that the CoV can provide a strong metric for measurement of filtering or ranking domains for the purpose of click traffic measurement. This can be used, for example, to predict relative monetization values based on click traffic. It also demonstrates the relative importance of a domain's history as Original Domains significantly outperform Reregistered Domains (868 Original clicks versus 160 Reregistered clicks).

In another approach, the impact of a domain's registration history can be measured by comparing the average amount of Clicks received per domain and by the type of domain (Original or Reregistered). FIG. 7 shows a comparison of the initial 643 domain set separated by a domain's history.

Figure 8:
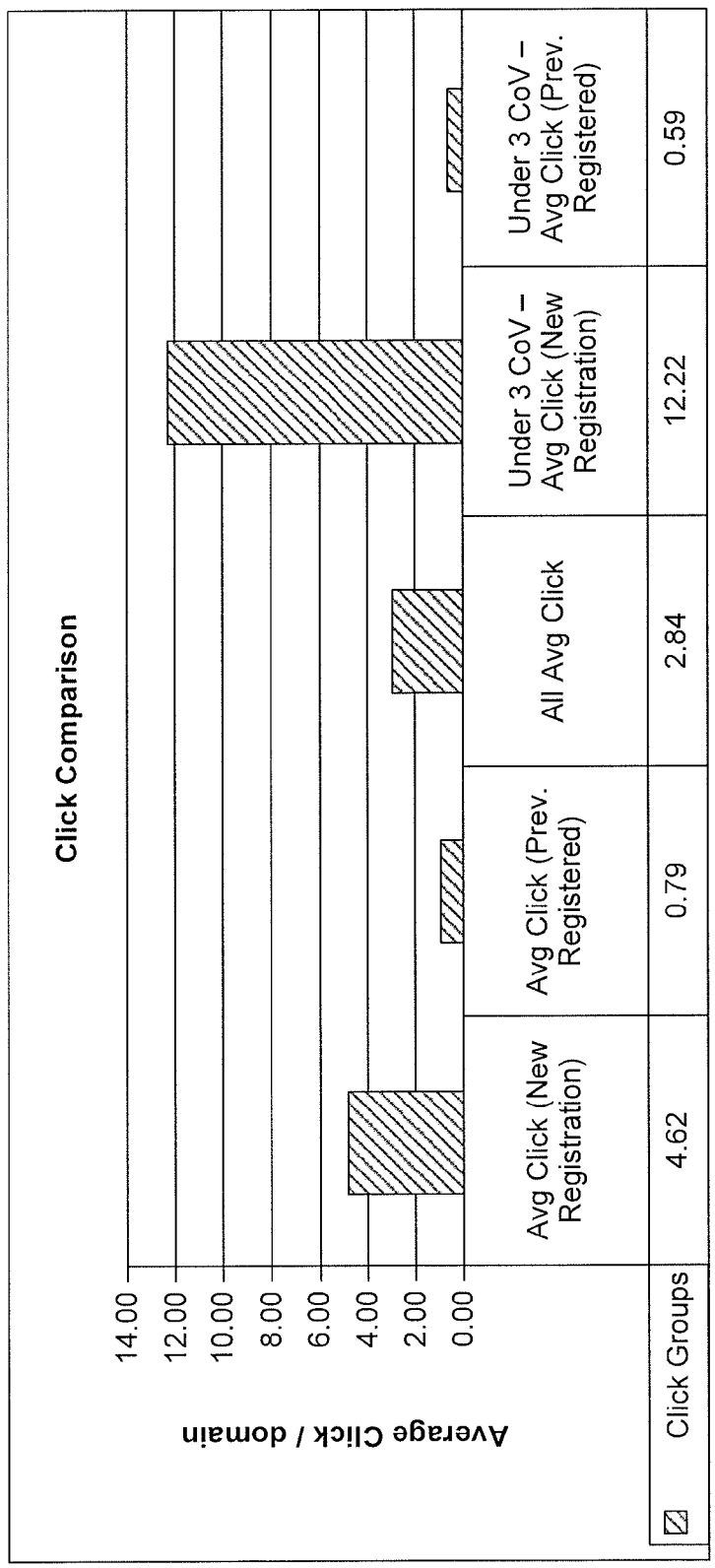
FIG. 8 is an illustrative comparison for the average amount of Clicks received per domain according to the type of domain, generated according to analyses consistent with disclosed embodiments.

To establish a baseline metric, the center column of the graph in FIG. 8 shows the average number of clicks for the entire initial 643 domain set to be 2.8 Clicks/domain. The two columns on the left shows the average click rate after separating this initial set of domains into groups of Original and Reregistered. It was found that the Original (New Registration) Domains have higher average click traffic than Reregistered (Previously Registered) domains at a 4.6 Clicks/domain rate versus that of a 0.79 Clicks/domain rate.

Filtering domains by their CoV level has been found to reduce the number of domains purchased yet still retain a high percentage of the initial Click traffic. A filter can be applied to the initial domain set to see the effect of average Clicks/domain. The two columns on the right of the graph in FIG. 8 show domains grouped by their domain history after filtering and have a CoV level below 3. Again, it was found that the Original Domains have a noticeably higher traffic rate than the Reregistered Domains, with a Click/domain rate of 12.2 versus that of 0.58 Click/domain.

It has been found that a domain's registration history can provide a reliable indication of expected click traffic for the domain. This correspondence can be used, for example, to value the domain for click monetization or other uses.

Profiling Domains Based on NXD Requests

Figure 9:
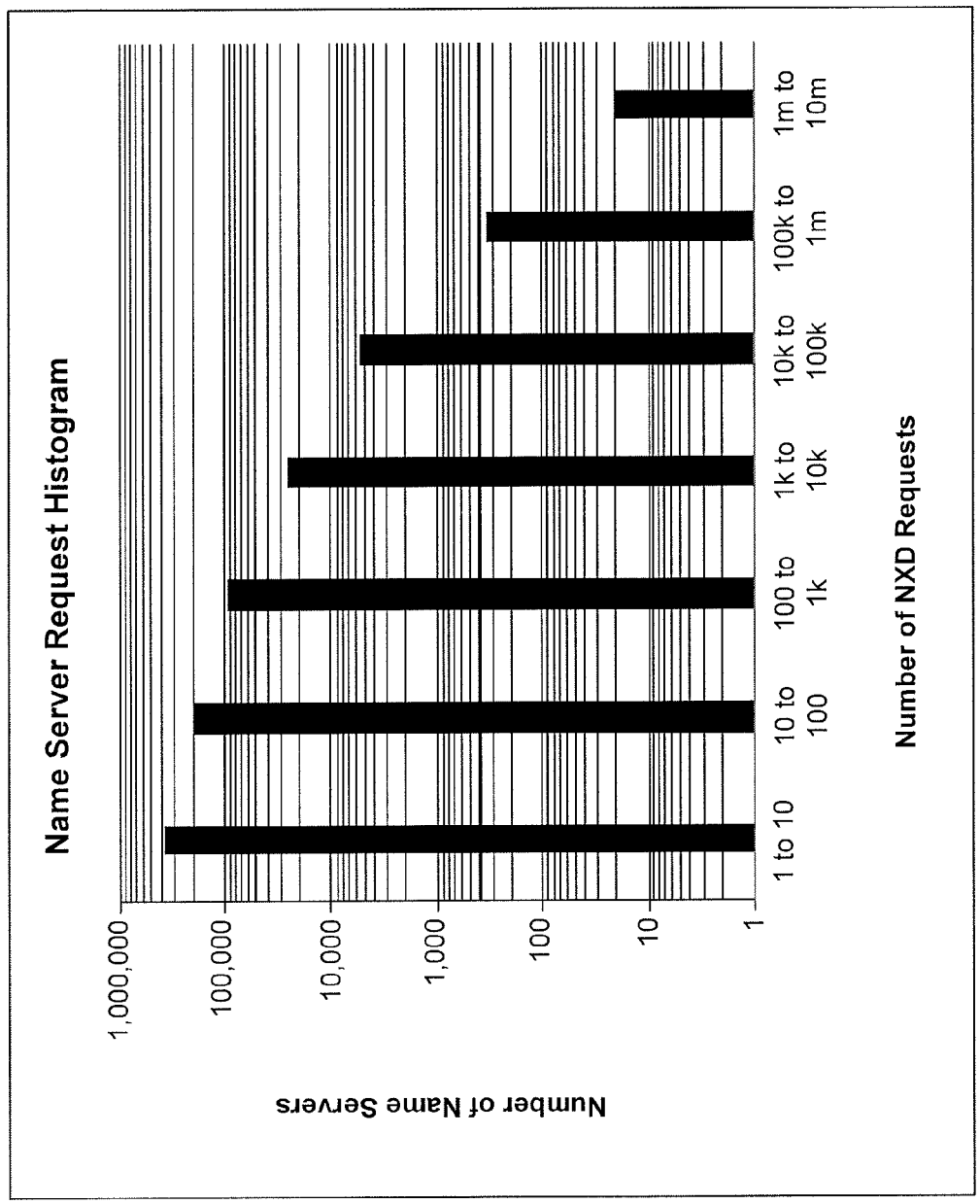
FIG. 9 is an illustrative histogram depicting the distribution of requesting name servers and number of requests generated by each name server grouping daily, generated according to analyses consistent with disclosed embodiments.

As disclosed herein, data regarding and derived from the distribution and makeup of name servers from which NXD data is received may allow for understanding the associated NXD traffic patterns. FIG. 9 shows a histogram of the distribution name servers from which requests typically are received, and the number of requests generated by each name server daily. This graph follows a power law distribution, in which there are many name servers generating very few NXD requests and very few name servers generating a majority of the requests. As an example, VeriSign Inc. receives NXD data from roughly 1.2 million unique name servers on an average day.

In an embodiment, NXD requests may be received from a plurality of name servers for a domain over a first period of time, and the size of each of the plurality of name servers determined, where the size of a name server being proportional to the total number of NXD requests sent by the name server. Based upon the determined sizes, the expected click traffic for the domain may be predicted.

In an embodiment, a method of evaluating a domain includes receiving NXD requests from a plurality of name servers for a domain over a first period of time, determining the number of unique name servers sending the requests, and based upon the determined number of unique name servers, predicting the expected click traffic for the domain.

In an embodiment, a method of evaluating a domain includes receiving NXD requests from a plurality of name servers for a domain over a first period of time, determining the size of each of the plurality of name servers, the size of a name server being proportional to the total number of NXD requests sent by the name server, determining the number of unique name servers sending the requests, and based upon the determined sizes and the determined number of unique name servers for the domain, predicting the expected click traffic for the domain.

Experimental Data

Figure 10:
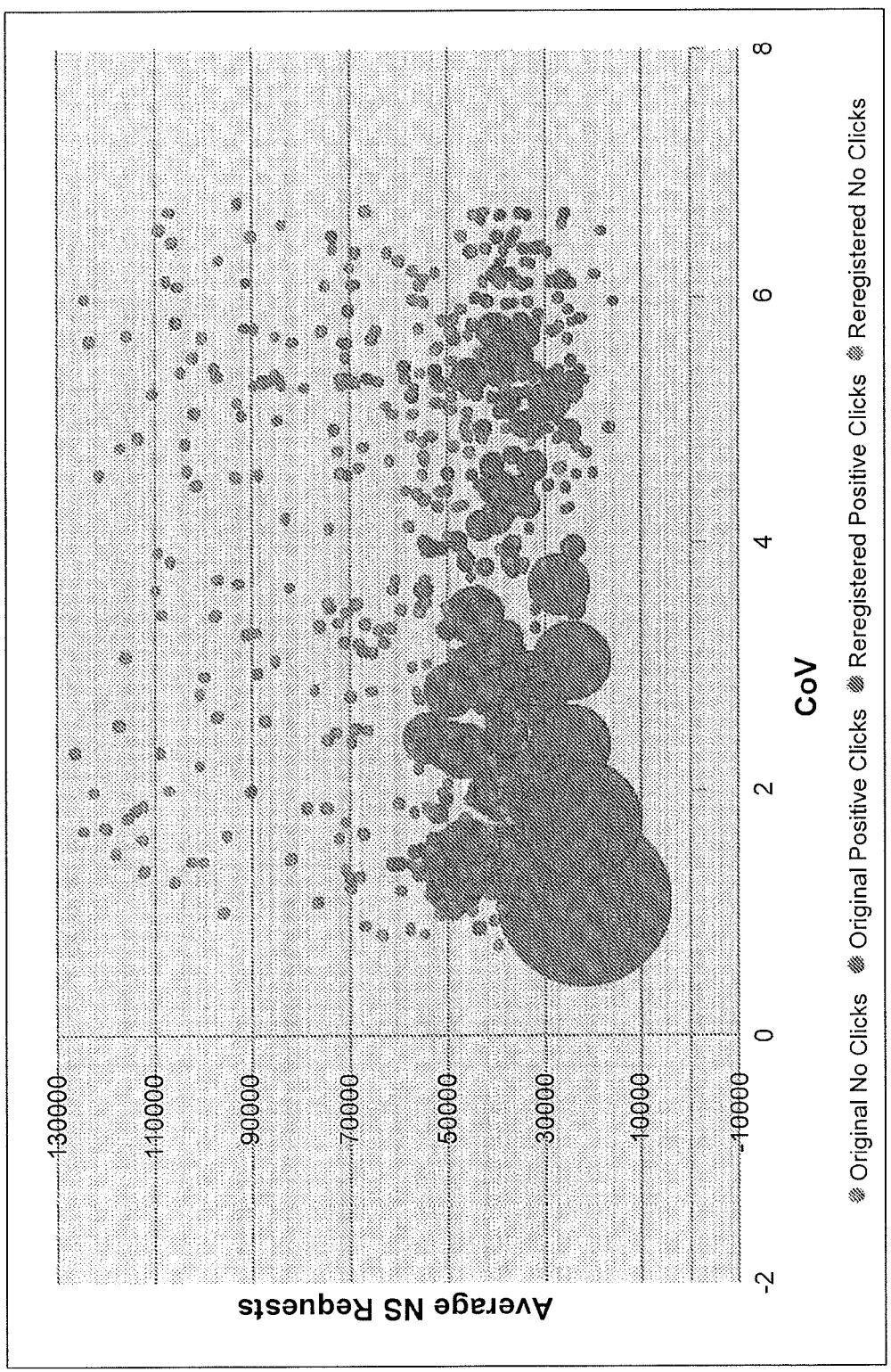
FIG. 10 is an illustrative plotting of domains separated into historical groups, CoV values, average size of requesting name servers, and amount of Clicks received, generated according to analyses consistent with disclosed embodiments.

A set of 643 domains was selected, and NXD measurements for all of these domains during a month were collected. These NXD scores were used in conjunction with name server profiling and classification data, were used to examine correlations between click traffic received post-registration of a domain and the size and number of requesting name servers Name Server Size FIG. 10 shows an example plot of the set of domains separated into their historical groups, CoV values, average size of their requesting name servers, and the amount of Clicks received (shown proportionally as bubbles). The average name server size is calculated by retrieving a list of all name servers that requested a domain, counting the total number of NXD requests sent by each of the name servers, and averaging the sums for each name server.

FIG. 10 shows the relationship between the size of name servers requesting a particular domain and the domain's Click traffic. Domains receiving traffic from high volume name servers generally receive little to no Click traffic, while domains receiving traffic from low volume name servers are the primary recipients of Click traffic. As disclosed earlier with respect to the global distribution of name servers, this correlation may suggest that high volume NXD name servers tend to be associated with Internet services such as email or spiders/agents, while low volume name servers are associated with human-driven activity. This would suggest that NXD requests may be considered as an abnormality in Internet traffic and, accordingly, name servers that exhibit relatively excessive amounts of NXD traffic typically do not reflect human-driven resolution activity.

Number of Unique Name Servers

Figure 11:
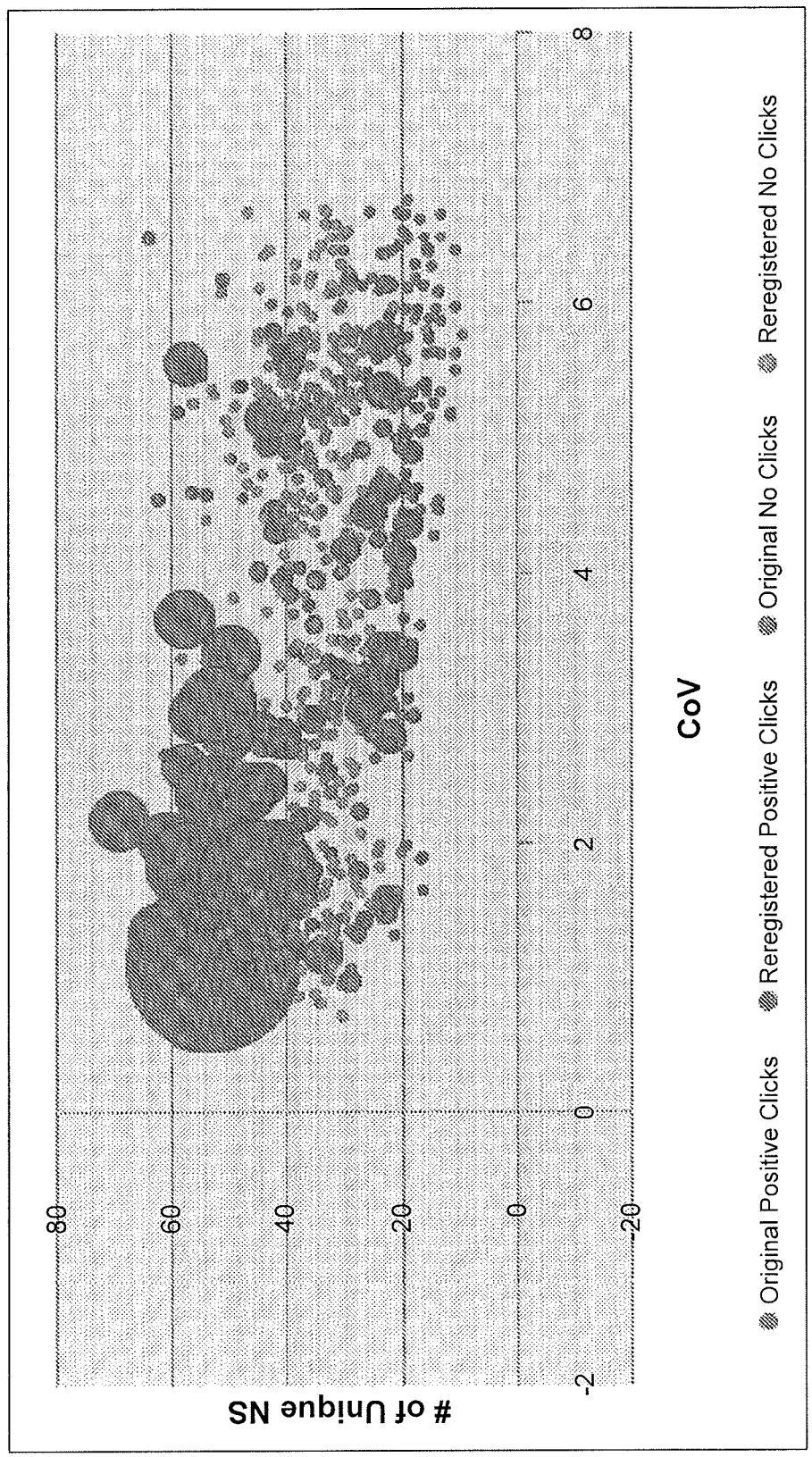
FIG. 11 depicts the total number of unique name servers in relation to CoV of a domain using analyses consistent with disclosed embodiments.

FIG. 11 depicts the total number of unique name servers (/24), rather than the average name server size for the set of domains, with the amount of Clicks received (shown proportionally as bubbles). It was found that domains are requested from a wider audience of name servers tend to be the recipients of Click traffic. This suggests that domains may be rated based on their YXD data, and that the total number of unique name servers receiving requests for each domain may provide an accurate metric to evaluate the perceived demand for a given domain.

Evaluating Name Server Metrics and Clicks

Figure 12:
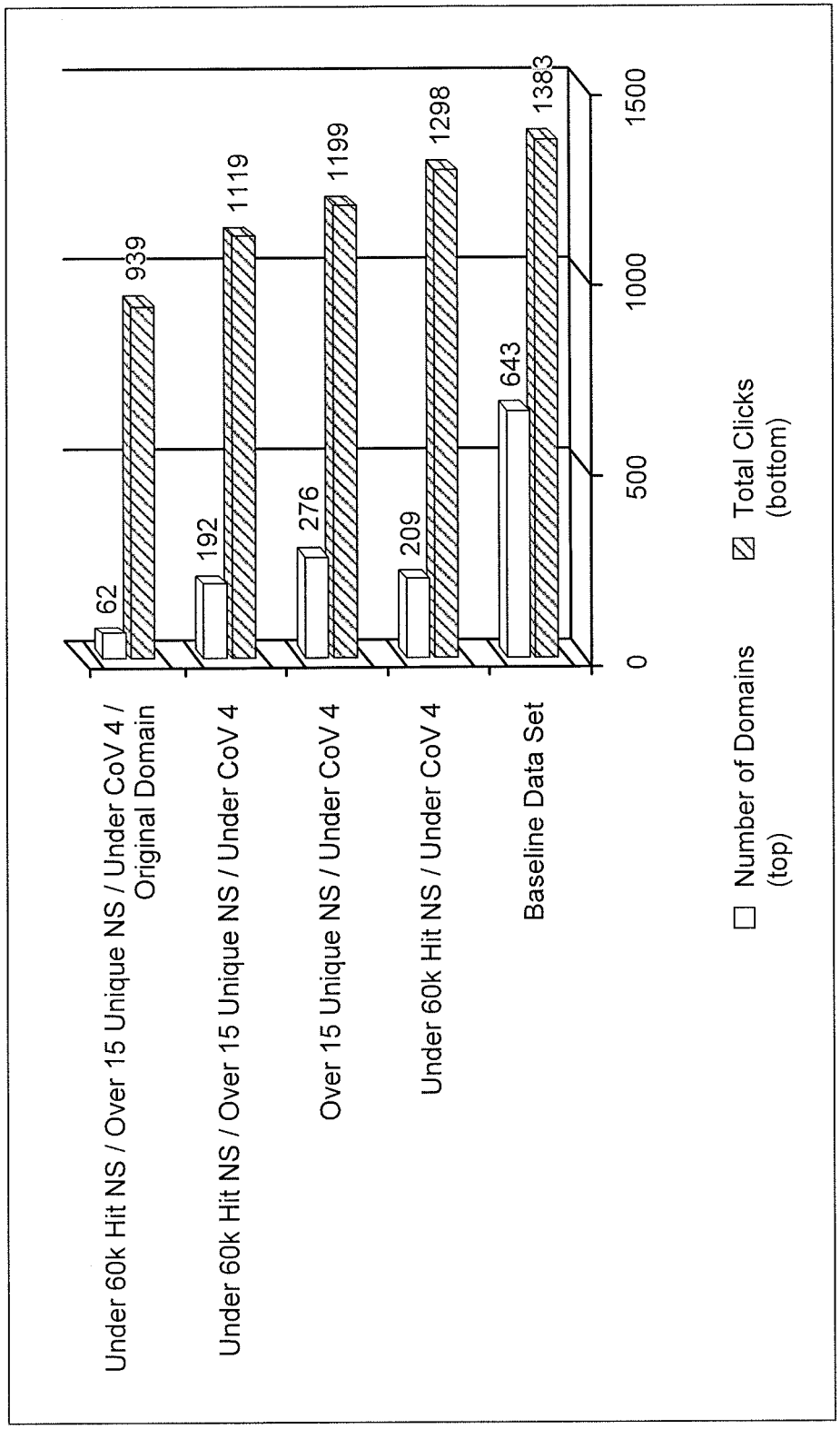
FIG. 12 depicts the quantitative-based comparisons of results associated with performed analyses consistent with disclosed embodiments.
Figure 13:
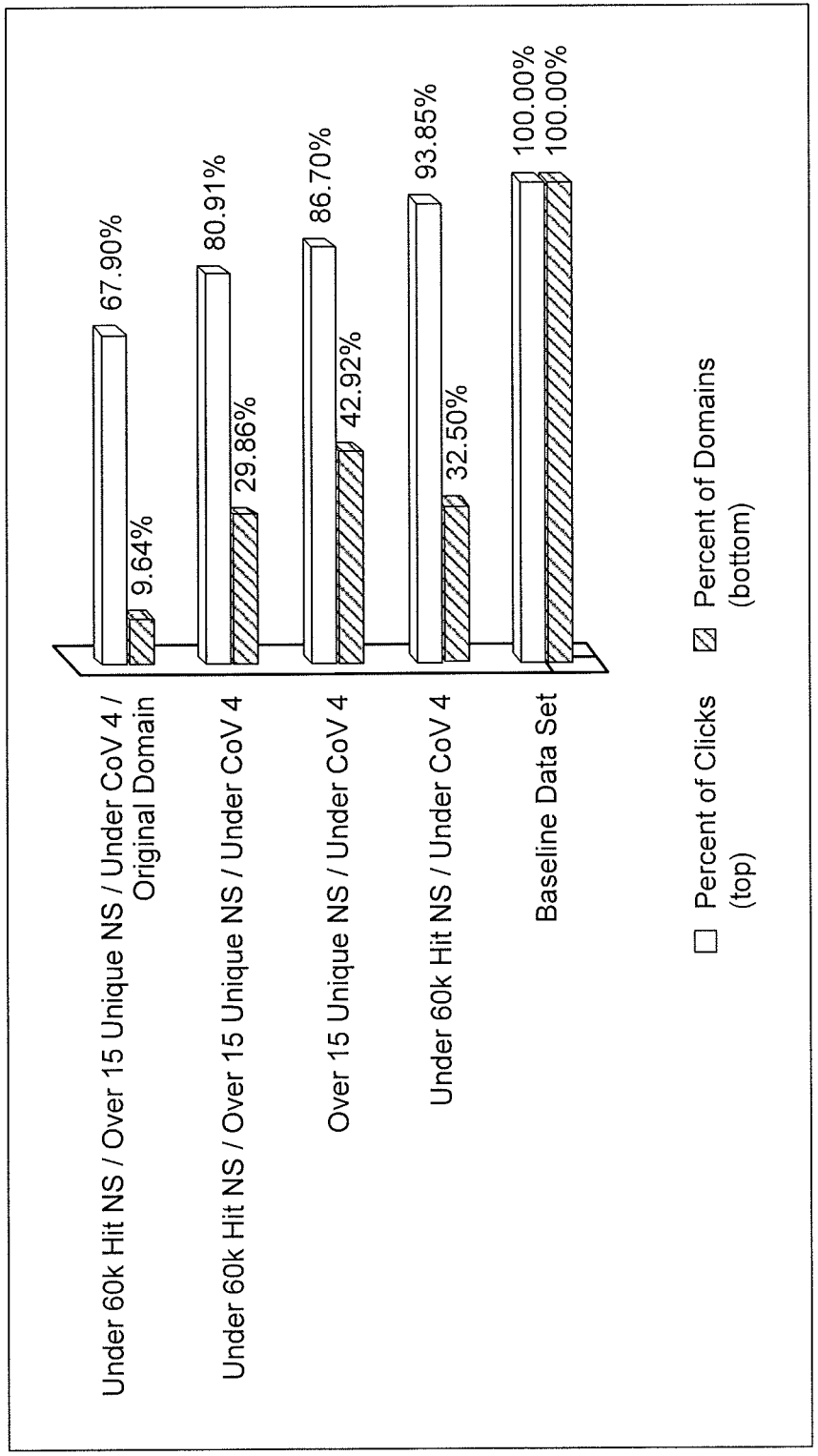
FIG. 13 depicts the percentage-based comparisons of results associated with performed analyses consistent with disclosed embodiments.

As disclosed herein, metrics such as CoV, registration history and name server profiling may allow for identification of domains that typically receive Click traffic, or that are relatively more likely to receive Click traffic than other domains. It also may be useful to understand how these metrics, when applied to a set of domains, may affect the number of domains purchased by a registrant or group of registrants, as well as the amount of Click traffic received. FIGS. 12-13 show quantitative and percentage-based comparisons of applying different filtering techniques of these newly discovered metrics.

The original data set included 643 domains and a total of 1383 Clicks. When a basic filtering technique of only purchasing domains under a CoV value of 4 and domains whose average name server size was under 60K is applied to the original data set, the number of domains purchased is reduced to 209. However, it was found that the number of Clicks received remained relatively high at 1298 (32.5% of the original amount of domains and 93.85% of the original amount of Clicks, as shown). Additional combinations of these new NXD-to-Click metrics were used as filtering techniques and their results are plotted in FIG. 13.

It has been found that using these metrics to identify potential domains for Click monetization provides measureable improvement over previously-known techniques of evaluating NXDomains.

An embodiment of the invention may be embodied in the form of computer-implemented processes and apparatuses for practicing those processes. Embodiments also may be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Examples provided herein are merely illustrative and are not meant to be an exhaustive list of all possible embodiments, applications, or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the relevant arts or fields are intended to be within the scope of the appended claims.

What is claimed is:

1. A method for predicting future network traffic, comprising:
   receiving non-existent domain (NXD) requests from a plurality of name servers for one or more candidate domains over a first period of time;
   calculating a variance in the NXD responses for the one or more candidate domains over time, wherein a higher variance indicates lower expected traffic levels;
   based on at least the calculated variance and received NXD requests, predicting at least one of expected name-in-use response levels for the one or more candidate domains, expected click traffic for the one or more candidate domains, or a combination thereof; and
   providing an indication of the expected name-in-use response levels, expected click traffic, or a combination thereof to a purchaser, wherein the indication comprises at least one of relative monetization values for the one or more candidate domains, value ratings for the one or more candidate domains according to a predetermined baseline, or predicted traffic statistics for the one or more candidate domains.

2. The method of claim 1, wherein the calculated variance is expressed as a Coefficient of Variance (CoV) value.

3. The method of claim 2, further comprising:
   filtering the one or more candidate domains to remove domains with a CoV value below a predetermined threshold level; and
   making the predictions only for the remaining one or more candidate domains.

4. The method of claim 1, wherein the predictions are made relative to one or more other domains.

5. A method for predicting future network traffic, comprising:
   receiving non-existent domain (NXD) requests from a plurality of name servers for one or more candidate domains over a first period of time;
   calculating a variance in the NXD responses for each of the one or more candidate domains over time, wherein a higher variance indicates lower expected traffic levels;
   determining the size of each of the plurality of name servers, the size of a name server being proportional to the total number of NXD requests sent by the name server;
   identifying the one or more candidate domains as an Original Domain or as a Reregistered domain; and
   based on the received NXD requests and at least one of the calculated variance, the identification of the one or more candidate domains as Original or Registered, the determined sizes of the plurality of name servers, or a combination thereof, predicting at least one of the expected name-in-use (YXD) response levels for the one or more candidate domains, the expected click traffic for the one or more candidate domains relative to at least one other domain, or a combination thereof.

6. The method of claim 5, further comprising:
   providing an indication of the expected name-in-use response levels, expected click traffic, or a combination thereof to a purchaser.

7. The method of claim 6, wherein the indication comprises at least one of relative monetization values for the one or more candidate domains, value ratings for the one or more candidate domains according to a predetermined baseline, or predicted traffic statistics for the one or more candidate domains.

8. The method of 5, further comprising:
   determining whether the received NXD requests for Re-registered domains are associated with machine-generated internet activity;
   filtering the received NXD requests to remove NXD requests associated with machine-generated internet activity for Re-registered domains; and
   making the prediction based on at least the identification and filtered NXD requests.

9. A computer-implemented method, performed by a computer system comprising one or more processors and computer memory, for predicting future network traffic, comprising:
    receiving non-existent domain (NXD) requests from a plurality of name servers for one or more candidate domains over a first period of time;
    calculating a variance in the NXD responses for the one or more candidate domains over time, wherein a higher variance indicates lower expected traffic levels;
    based on at least the calculated variance and received NXD requests, predicting at least one of expected name-in-use response levels for the one or more candidate domains, expected click traffic for the one or more candidate domains, or a combination thereof; and
    providing an indication of the expected name-in-use response levels, expected click traffic, or a combination thereof to a purchaser, wherein the indication comprises at least one of relative monetization values for the one or more candidate domains, value ratings for the one or more candidate domains according to a predetermined baseline, or predicted traffic statistics for the one or more candidate domains.

10. The computer-implemented method of claim 9, wherein the calculated variance is expressed as a Coefficient of Variance (CoV) value.

11. The computer-implemented method of claim 10, further comprising:
    filtering the one or more candidate domains to remove domains with a CoV value below a predetermined threshold level; and
    making the predictions only for the remaining one or more candidate domains.

12. The computer-implemented method of claim 9, wherein the predictions are made relative to one or more other domains.

13. A system comprising:
one or more processors; and
memory storing instructions that, when executed by the one or more processors, perform a method for predicting future network traffic, comprising:
    receiving non-existent domain (NXD) requests from a plurality of name servers for one or more candidate domains over a first period of time;
    calculating a variance in the NXD responses for the one or more candidate domains over time, wherein a higher variance indicates lower expected traffic levels;
    based on at least the calculated variance and received NXD requests, predicting at least one of expected name-in-use response levels for the one or more candidate domains, expected click traffic for the one or more candidate domains, or a combination thereof; and
    providing an indication of the expected name-in-use response levels, expected click traffic, or a combination thereof to a purchaser, wherein the indication comprises at least one of relative monetization values for the one or more candidate domains, value ratings for the one or more candidate domains according to a predetermined baseline, or predicted traffic statistics for the one or more candidate domains.

14. The system of claim 13, wherein the calculated variance is expressed as a Coefficient of Variance (CoV) value.

15. The system of claim 14, wherein the one or more processors further perform the method comprising:
    filtering the one or more candidate domains to remove domains with a CoV value below a predetermined threshold level; and
    making the predictions only for the remaining one or more candidate domains.

16. The system of claim 13, wherein the predictions are made relative to one or more other domains.

17. A non-transitory computer-readable storage medium containing instructions which, when executed on a processor, perform a method for predicting future network traffic, comprising:
    receiving non-existent domain (NXD) requests from a plurality of name servers for one or more candidate domains over a first period of time;
    calculating a variance in the NXD responses for the one or more candidate domains over time, wherein a higher variance indicates lower expected traffic levels; and
    based on at least the calculated variance and received NXD requests, predicting at least one of expected name-in-use response levels for the one or more candidate domains, expected click traffic for the one or more candidate domains, or a combination thereof; and
    providing an indication of the expected name-in-use response levels, expected click traffic, or a combination thereof to a purchaser, wherein the indication comprises at least one of relative monetization values for the one or more candidate domains, value ratings for the one or more candidate domains according to a predetermined baseline, or predicted traffic statistics for the one or more candidate domains.

18. A system comprising:
one or more processors; and
memory storing instructions that, when executed by the one or more processors, perform a method for predicting future network traffic, comprising:
    receiving non-existent domain (NXD) requests from a plurality of name servers for one or more candidate domains over a first period of time;
    calculating a variance in the NXD responses for each of the one or more candidate domains over time, wherein a higher variance indicates lower expected traffic levels;
    determining the size of each of the plurality of name servers, the size of a name server being proportional to the total number of NXD requests sent by the name server;
    identifying the one or more candidate domains as an Original Domain or as a Reregistered domain; and
    based on the received NXD requests and at least one of the calculated variance, the identification of the one or more candidate domains as Original or Registered, the determined sizes of the plurality of name servers, or a combination thereof, predicting at least one of the expected name-in-use (YXD) response levels for the one or more candidate domains, the expected click traffic for the one or more candidate domains relative to at least one other domain, or a combination thereof.

19. A non-transitory computer-readable storage medium containing instructions which, when executed on a processor, perform a method for predicting future network traffic, comprising:
    receiving non-existent domain (NXD) requests from a plurality of name servers for one or more candidate domains over a first period of time;
    calculating a variance in the NXD responses for each of the one or more candidate domains over time, wherein a higher variance indicates lower expected traffic levels;
    determining the size of each of the plurality of name servers, the size of a name server being proportional to the total number of NXD requests sent by the name server;
    identifying the one or more candidate domains as an Original Domain or as a Reregistered domain; and based on the received NXD requests and at least one of the calculated variance, the identification of the one or more candidate domains as Original or Registered, the determined sizes of the plurality of name servers, or a combination thereof, predicting at least one of the expected name-in-use (YXD) response levels for the one or more candidate domains, the expected click traffic for the one or more candidate domains relative to at least one other domain, or a combination thereof.

* * * * *